(12) United States Patent
Shutt et al.

(10) Patent No.: US 10,767,306 B2
(45) Date of Patent: Sep. 8, 2020

(54) WATER BASED LIQUID FIRE RETARDANT FOR USE IN CELLULOSE INSULATION

(71) Applicant: NTIP LLC, Milwaukee, WI (US)

(72) Inventors: Thomas C. Shutt, Milwaukee, WI (US); William R. Sellars, Milwaukee, WI (US)

( * ) Notice: Subject to any disclaimer, the term of this patent is extended or adjusted under 35 U.S.C. 154(b) by 0 days.

(21) Appl. No.: 16/108,256

(22) Filed: Aug. 22, 2018

(65) Prior Publication Data

US 2019/0062989 A1    Feb. 28, 2019

Related U.S. Application Data

(60) Provisional application No. 62/549,182, filed on Aug. 23, 2017.

(51) Int. Cl.
| | | |
|---|---|---|
| *D06M 11/70* | (2006.01) | |
| *C09K 21/04* | (2006.01) | |
| *D21H 21/34* | (2006.01) | |
| *D06M 11/56* | (2006.01) | |
| *D06M 11/45* | (2006.01) | |
| *D06M 23/08* | (2006.01) | |
| *D21H 17/10* | (2006.01) | |

(52) U.S. Cl.
CPC ............ *D06M 11/70* (2013.01); *C09K 21/04* (2013.01); *D06M 11/45* (2013.01); *D06M 11/56* (2013.01); *D06M 23/08* (2013.01); *D21H 5/0002* (2013.01); *D21H 17/10* (2013.01); *D21H 21/34* (2013.01); *D06M 2200/30* (2013.01)

(58) Field of Classification Search
CPC ..................................................... D06M 11/70
See application file for complete search history.

(56) References Cited

U.S. PATENT DOCUMENTS

| | | |
|---|---|---|
| 4,173,666 A | 11/1979 | Quinto |
| 4,228,202 A * | 10/1980 | Tjannberg .............. D06M 11/55 106/18.14 |
| 2004/0036191 A1* | 2/2004 | Rodda ..................... B27N 9/00 264/109 |
| 2004/0121114 A1 | 6/2004 | Piana et al. |
| 2014/0079942 A1 | 3/2014 | Lally |
| 2014/0093742 A1 | 4/2014 | Saari |
| 2015/0147478 A1 | 5/2015 | Shutt |

FOREIGN PATENT DOCUMENTS

| | | |
|---|---|---|
| WO | 2016/187304 A1 | 11/2016 |
| WO | 2017/053554 A1 | 3/2017 |

* cited by examiner

*Primary Examiner* — Peter F Godenschwager
(74) *Attorney, Agent, or Firm* — Husch Blackwell LLP

(57) ABSTRACT

A fire-retarded cellulose fiber material composed of phosphoric acid and ammonium sulfate as fire-retardant chemical components, absorbed, adsorbed and/or adhered on the cellulose fibers, and optional non-fire retardant additives, and methods of producing the fire-retarded cellulose fiber material are disclosed.

14 Claims, No Drawings

WATER BASED LIQUID FIRE RETARDANT FOR USE IN CELLULOSE INSULATION

FIELD OF THE INVENTION

Embodiments of the invention relate to fire-retarded cellulose products, and methods of producing cellulose insulation and other products.

BACKGROUND OF THE INVENTION

Cellulose insulation is typically manufactured from recycled paper and cardboard. The U.S. government requires that all cellulose insulation meet ASTM C-739. This mandate requires testing for critical radiant flux (CRF) (flame), smoldering combustion, odor emission, corrosion, thermal resistance (R-value), fungi resistance, and moisture absorption. In addition to these tests, off-gassing of ammonia or the toxicity of boric acid are problems that need to be addressed. The air-borne dust generated during the installation of cellulose insulation creates an unpleasant working environment for installers and presents an infertility issue in cases where borates are used. Borates are used in 99% of cellulose insulation. While removal of dust from cellulose insulation rectifies many problems, there remains the problem of disposal of the dust.

Burning or combustion of cellulose fiber materials such as paper, cardboard, etc., generally involves two different chemical processes: a) flaming, which results from ignition of gases released by pyrolysis of the cellulose fiber material, and b) smolder, a slow, high temperature, flameless combustion which results from oxidation of the remaining carbon-rich material, as with charcoal in a barbeque.

Cellulose insulation is flammable and prone to smoldering. However, specific chemical additions to a paper material will increase its resistance to burning. Some chemicals will extinguish flaming but not smoldering combustion. Examples of such flame-only extinguishing chemicals include borax pentahydrate, hydrated magnesium sulfate, aluminum trihydrate, and ammonium sulfate, among others. Other chemicals can extinguish both flaming and smolder. Examples of these chemicals include ammonium sulfate and boric acid.

Although there are many chemicals that extinguish flaming, to date, boric acid is the only known economically viable chemical that can effectively extinguish smolder. Boric acid is the primary smolder inhibitor. The two fire-retardant formulas in almost exclusive use today in the cellulose insulation manufacturing industry are: a) 1 part boric acid to 2 or 3 parts ammonium sulfate (60%), and b) 1 part boric acid to 2 to 3 parts borax (35%). The remaining 5 percent of industry products will always use boric acid (as smolder inhibitor) with other flame inhibitors such as Epsom salts, etc. Without boric acid, smolder could not be guaranteed to be prevented, and in order to market cellulose insulation products, the U.S. government mandates the prevention of smolder.

Borates and ammonium sulfate represent 95% (by weight) of all the flame retardants used by the cellulose industry but their future use is in doubt because of government restrictions. France has banned the use of ammonium sulfate because of ammonia out-gassing and consequent problems. Europe is expected to follow. There are growing concerns about potential adverse health effects associated with the use of and exposure to borate compounds (e.g., borax, boric acid, etc.), which, although providing fire retardant and insecticidal properties, are respiratory irritants and have shown to have adverse reproductive effects in test animals. Europe banned the use of any borate compound due to fears of infertility. Pleas from the cellulose industry lead to the European Union (EU) giving a 2-year allowance to use borates but restricted its use to 5% by weight of the finished product. The U.S. government has these two problems under consideration but until a conclusion is reached it is required for manufacturers to inform users of its products that they could interfere with reproduction.

Testing for flaming is carried out using critical radiant flux (CRF) equipment. In that test, a "pass" is achieved if the cellulose material will not support surface burning while being subjected to radiation of 0.12 watts/cm$^2$ or less. Smolder testing is performed by positioning a lighted cigarette into a sample of insulation at settled density contained within a 9"×9"×4" open-top stainless steel box. The sample is left for 2 hours after which it is considered to be a pass if it loses less than 15% of its original weight.

In Europe, various classifications are available ranging from Category A to Category F. Chemical loading that allows cellulose insulation to meet ASTM C-739 would also allow it to meet a Category B. To obtain a Category C listing, lesser amounts of chemical can be used than required under ASTM C-739 standards.

In order to prevent flaming and smoldering combustion, most cellulose insulation is manufactured by applying fire retardant chemicals in powder form, for example, hydrated borax, boric acid, ammonium sulfate, aluminum trihydrate (ATH), etc. In order to meet government standards for cellulose insulation, the loading of a powdered chemical is typically about 14% to 18% by weight (wt %) of the final insulation product. However, powdered chemicals are relatively expensive and their inclusion significantly raises the costs associated with the manufacture of a cellulose insulation product.

In addition, applying fire retardant chemicals only in powder form dusts the cellulose particle surface, with a large portion of the powder being present in the product as loose dust particles, requiring high loadings of chemical and higher costs. By comparison, the application of a liquid form of the fire retardant chemical will penetrate the cellulose particles and thereby require lower loading of the fire retardant chemical. This application of liquid fire retardant chemical can lower raw material cost to result in appreciable cost savings. Liquid fire retardant compositions are described, for example, in U.S. Pat. Nos. 4,595,414 and 4,168,175 (Shutt). Examples of liquid fire retardant chemicals include aqueous solutions of ammonium sulfate, monoammonium phosphate, diammonium phosphate, ammonium tripolyphosphate, boric acid, ferrous sulfate, zinc sulfate, and mixtures thereof, dissolved in water. Of those chemicals, ammonium sulfate is the most popular due to its low price and high solubility in water.

A disadvantage of currently known liquid fire retardant chemicals is that they can be corrosive and/or devolve ammonia through off-gassing. In addition, as discussed above, exposure to borate compounds has been linked to potential adverse health effects.

Corrosion under insulation (CUI) is corrosion that develops over time beneath thermal insulation used, for example, on pipes, tanks and various manufacturing and process equipment. CUI typically results from condensation, rainwater, cleaning fluids, etc., that seep in and permeate into the insulation and onto the underlying substrate and subsequently cause off-gassing of ammonia resulting in corrosion of pipes, etc., and damage to the substrate.

Accordingly, it would be desirable from an industry standpoint to provide a cellulose material that would overcome the foregoing disadvantages. It would also be desirable to produce such a cellulose material at a low cost, with liquid chemical as the sole flame retardant which will possess the requisite level of fire retardance to meet various government regulations and standards.

SUMMARY

The present invention provides a fire-retarded cellulose fiber material and cellulose products, and methods of production.

The fire-retardant formulation presented herein uses no borates, prevents ammonium sulfate from off-gassing and meets all government performance requirements, as outlined in ASTM C-739). All of the chemicals utilized are eco-friendly so that in the case where dust is removed from the final product, it can be used as a soil attenuator or mulch.

The present invention provides a chemistry and method of making a fire retarded cellulose material that meets governmental standards in both Europe and the United States for flame, smolder, corrosion, smell and mold while at the same time controlling pH of the fire retarded material. Borates are eliminated from any part of the present formulations.

The use of ammonium salts as fire-retardant chemicals has been known to pose issues of ammonia off-gassing. It was unexpectedly found that the problem of off-gassing of ammonia from an ammonium sulfate aqueous solution can be eliminated by adding an amount of phosphoric acid to the solution sufficient to a) lower the pH of the solution to a level at which ammonia gas cannot evolve, b) pass corrosiveness requirements under ASTM C-739 cellulosic insulation testing, and c) not deteriorate the cellulose base material of a cellulosic insulation.

While achieving all the foregoing criteria above, the present invention utilizes raw materials that not only have fire retardant properties but are also not harmful to the earth (i.e., eco-friendly). In addition, the components that are used enable the dust by-product to be used in creating products for soil amendments and other mulch products that contain a value-added fertilizer component. The present formulations and methodology can be consistently and effectively run in a factory on a commercial scale and at a lowered cost compared to other known systems. In addition, because the fire retardant chemical applied as a liquid composition is more efficient than powder fire retardant chemicals in adhering to a cellulose material, a lesser amount of total fire retardant chemical is required using the present compositions to achieve the same level of fire retardance compared to applications using powdered fire retardant chemicals. Additionally, the present compositions are not carcinogenic and do not interfere with human reproduction.

Embodiments of this invention relate to manufacturing a fire-retarded cellulose insulation that is both highly effective and economical. The cellulose insulation material incorporates liquid fire retardant technology that enables it to be effectively dedusted. The cellulose dust commonly found in other cellulose-based insulation fabricated by applying powdered chemicals is highly undesirable because too much fire-retardant chemical is removed and some of the chemicals may not be environmentally friendly (e.g., boric acid). By using the described liquid fire retardant composition to produce a fire-retarded cellulose material, the dust that is removed (e.g., screened) from the cellulose product (e.g., insulation material) can be used as mulch. In an embodiment, the liquid fire-retardant composition can be used to produce cellulose insulation material, which can be utilized as a mulch product that comprises a fertilizer component. This is highly important as it enables the dust by-product to be useful in creating mulch products such as soil amendment products or mulch containing a fertilizer component. In embodiments, the mulch product is composed of cellulose dust and a fertilizer component. In embodiments, the fertilizer component of the mulch product is comprised of phosphoric acid ($H_3PO_4$) and ammonium sulfate (($NH_4$)$_2$$SO_4$).

In embodiments, the present compositions (formulations) and manufacturing techniques create two highly functional and useful products from one manufacturing process, i.e., a fire-retarded cellulose insulation product, and a mulch product comprising a fertilizer component (e.g., fertilizer, soil amendment, etc.). In embodiments, another important criterion is that the fire-retardant formulation contains no borates, which have been found to be harmful to male reproductive health and are herbicides.

The liquid fire-retardant composition is an aqueous solution that is applied to the cellulose fiber material to provide fire-resistance. The liquid fire-retardant composition is designed to prevent offgassing of ammonia and prevent "relight" of burned cellulose while meeting ASTM C-739 requirements for cellulosic insulation. In an embodiment, the liquid fire-retardant composition comprises an aqueous solution of phosphoric acid ($H_3PO_4$), ammonium sulfate ($NH_4$)$_2$$SO_4$, and water. In an embodiment, the fire-retardant composition consists of or, in other embodiments, consists essentially of, phosphoric acid ($H_3PO_4$), ammonium sulfate ($NH_4$)$_2$$SO_4$, and water. In embodiments, the ammonium sulfate ($NH_4$)$_2$$SO_4$ component is the principal flame extinguisher, the phosphoric acid ($H_3PO_4$) component is the principal smolder and "relight" inhibitor and pH controller, and water is the solvent. In embodiments, the liquid fire-retardant composition can further include optional non-fire retardant additives such as a surfactant.

Control of pH in the final cellulose product is essential if off-gassing of ammonia from ammonium sulfate is to be eliminated. Ammonia off-gassing starts to occur when the pH of the cellulose product exceeds 6.8 and accelerates as the pH increases. Control of pH is problematic when installations of cellulose insulation occur which require water additions during the installation process. Such is the case when the "stabilized" system of insulating attics is used or when wet-spray is used in wall applications. In both applications, a corn starch powder (~2%) will have been added to the cellulose material during manufacture. Its adhesive potential is activated by the addition of a water spray during installation. This adhesive property prevents cellulose from settling in attic applications or from falling out of walls during the drying stage prior to encapsulating with wall board. In both applications, the water that is used is mains water (tap water), which typically has a pH of 7.2 to 7.8. Mains water, up to 50% of the weight of the cellulose insulation, is used in these applications. If the chemicals in the cellulose insulation cannot quickly reduce the overall pH to 6.8 or below, then ammonia is liberated from the material.

The invention solves the problem of off-gassing of ammonia from cellulose material containing an ammonium sulfate compound through the addition of phosphoric acid to an ammonium sulfate solution in sufficient quantity to convert the mains water (typically pH 7.2 to 7.8) used in specialized ("stabilized") applications to a pH below 6.8.

In an embodiment, the fire-retarded cellulose fiber material is produced by applying a liquid fire retardant composition comprising an aqueous solution of phosphoric acid and ammonium sulfate as the sole or principal flame retardant chemical component to a cellulose material, such that the cellulose material has a pH of about pH 5 to 6.5, and then de-dusting the dried cellulose material to remove and eliminate an amount of dust from the material. In embodiments, the fire-retardant composition comprises, or consists of, or consists essentially of, phosphoric acid ($H_3PO_4$), ammonium sulfate ($(NH_4)_2SO_4$), and water, and optional non-fire retardant additives.

In an embodiment, the liquid, fire retardant composition comprises an amount of the phosphoric acid, ammonium sulfate and water components such that ammonia does not off-gas from the treated cellulose material (e.g., cellulose insulation) under extreme use conditions such as exposure to water and/or to heat up to 400° F., for example. A product (e.g., cellulose insulation) produced by applying the liquid, fire retardant composition to a base substrate (e.g., cellulose material) will not support fungus, and a cellulose insulation product produced by applying the composition to a cellulose-based substrate will pass the requirements of ASTM C-739. In an embodiment, the liquid, fire retardant composition has a pH of 1.75 to 2.6.

In an embodiment, a fire-retarded cellulose product produced by applying the composition to a cellulose-based substrate comprises, or consists of, or consists essentially of, phosphoric acid ($H_3PO_4$) and ammonium sulfate ($(NH_4)_2SO_4$) which are absorbed, adsorbed and/or adhered to the cellulose material (e.g., fibers) as the sole fire retardant chemical. In an embodiment, the cellulose product (e.g., cellulose insulation) produced by applying the liquid fire retardant composition to a cellulose material, has a pH of 5 to 6.5.

In an embodiment, the method of producing a fire-retarded cellulose fiber material according to the invention comprises the steps of:

applying a solution of a liquid fire-retardant composition to a cellulose material to produce a wetted, fire retardant-treated cellulose material, wherein the liquid fire-retardant composition comprises an aqueous solution of phosphoric acid ($H_3PO_4$), ammonium sulfate ($(NH_4)_2SO_4$) and water, and optionally, one or more additives;

drying the wetted, fire retardant-treated cellulose material to produce a dried, fire retardant-treated cellulose material having the liquid fire-retardant composition absorbed therein and/or dried thereon;

reducing the dried, fire retardant-treated cellulose material in size to produce a reduced size, fire-retarded cellulose fiber material; and removing an amount of dust material from the reduced size, fire-retarded cellulose fiber material to produce a reduced-dust, fire-retarded cellulose fiber material.

In embodiments, the method comprises applying a solution of a fire-retardant composition that comprises, consists of, or consists essentially of, phosphoric acid ($H_3PO_4$), ammonium sulfate ($(NH_4)_2SO_4$) and water, and optional non-fire retardant additives.

In an embodiment, the fire-retarded cellulose product comprises, or consists of, or consists essentially of, phosphoric acid ($H_3PO_4$) and ammonium sulfate ($(NH_4)_2SO_4$) absorbed, adsorbed and/or adhered to the cellulose fibers, as the sole fire retardant chemical.

In an embodiment, the invention is a fire-retarded cellulose fiber material (e.g., cellulose insulation) comprising cellulosic fibers and phosphoric acid ($H_3PO_4$) and ammonium sulfate ($(NH_4)_2SO_4$) absorbed, adsorbed and/or adhered to the cellulose fibers. In an embodiment, the fire-retarded cellulose fiber material is a de-dusted material.

In an embodiment, the dried, de-dusted fire-retarded cellulose fiber material (product) (e.g., insulation) has a pH of 5 to 6.5.

In an embodiment, the dried, de-dusted fire-retarded cellulose fiber material (product) (e.g., insulation) comprises, based on the total weight of the cellulose product:
  a) 85 to 94 wt % cellulosic fiber;
  b) 5.5 to 14.5 wt % phosphoric acid ($H_3PO_4$) and ammonium sulfate ($(NH_4)_2SO_4$) in a ratio of 1:19 to 5:15 (w/w); and
  c) 0 to 0.5 wt % surfactant(s).

In an example embodiment, the fire retardant cellulose fiber material comprises, based on the total weight of the cellulose fiber material, 93.8 to 89.8 wt % of cellulose fiber, 6 to 10 wt % of phosphoric acid ($H_3PO_4$)/ammonium sulfate ($(NH_4)_2SO_4$) as the fire retardant chemicals, and 0 to 0.2 wt % surfactant.

In an embodiment, the sole flame retardant component of the fire-retarded cellulose material is phosphoric acid ($H_3PO_4$) and ammonium sulfate ($(NH_4)_2SO_4$). In embodiments, the fire retardant cellulose fiber material is without the presence of borates.

The cellulose fiber material produced according to the disclosure possesses the requisite level of fire retardance to meet government standards. In embodiments, the cellulose fiber material has a CRF value of 0.12 watts/cm$^2$ or greater, as measured according to ASTM C-739. In embodiments, a fire resistant cellulose insulation material has a settled bulk density of 1 to 2 lbs/ft$^3$.

DESCRIPTION OF THE INVENTION

In a first aspect, the present invention relates to a fire-retarded cellulose fiber (e.g., paper-based) material. In an embodiment, the fire-retarded cellulose fiber material is produced by the application of a liquid fire-retardant composition composed of an aqueous solution of phosphoric acid ($H_3PO_4$), ammonium sulfate ($(NH_4)_2SO_4$), wherein the composition has a pH of 5 to 6.5. In an embodiment, the fire-retardant composition consists of or, in other embodiments, consists essentially of, phosphoric acid ($H_3PO_4$), ammonium sulfate ($(NH_4)_2SO_4$), and water, and optional non-fire retardant additives. In an embodiment, the treated, fire-retarded cellulose fiber material (product) is composed of phosphoric acid ($H_3PO_4$) and ammonium sulfate ($(NH_4)_2SO_4$) as a majority weight percent (wt %) of the fire retardant compound, absorbed in, adsorbed to, adhered to and/or dispersed within the cellulose fiber material, wherein the cellulose fiber material has a pH of 5 to 6.5.

In a second aspect, the invention relates to methods of producing the fire-retarded cellulose material having a pH of 5 to 6.5 by application of a liquid fire-retardant composition composed of an aqueous solution of phosphoric acid ($H_3PO_4$), ammonium sulfate ($(NH_4)_2SO_4$) and water, and optional non-fire retardant additives, to a cellulose fiber material. In embodiments, the products and methods of the invention avoid the application of fire retardants in powdered (dry) form to the cellulose material.

The cellulose product of the invention possesses a high level of fire resistance at a much lower cost than other cellulose-based products. In embodiments, in fabricating the cellulose product, no dry powdered fire retardant compounds need to be applied to or included in the cellulose material. The application of the liquid fire retardant composition of the invention as the sole fire retardant component can lower costs in the manufacturing of the cellulose product, e.g., insulation, and also eliminate potential problems of corrosiveness and odor, which can occur in the use of conventional powdered fire retardants.

Processes for applying liquid fire-retardant compositions to cellulose materials are known in the art, as described, for example, in U.S. Pat. No. 5,534,301 (Shutt).

Shredder

Briefly, a supply of cellulose-containing material can be loaded onto a feed table where the cellulose material can be sorted and separated from non-cellulose materials, and then conveyed into a shredding apparatus to physically reduce the cellulose material to a desired size (e.g., pieces of paper), for example, a typical average width and length of 0.5 to 2 inches (1.25 to 5 cm). Cellulose-containing materials typically comprise wood or other plant materials, for example, cotton, flax, hemp, kenaf and jute, among others, known and used in the art for producing cellulose-based materials, for example but not limited to, unused or used (recycled) paper such as newspaper, cardboard, fiberboard, paperboard, etc. The shredding apparatus may involve different types of standard systems known in the art.

Application of Liquid Fire-Retardant Composition

In embodiments, the liquid fire retardant composition is then applied to wet (moisten) the reduced size cellulose material. In embodiments, the application of the present liquid fire-retardant compositions will render a cellulose material resistant to both flame and smolder combustion.

In an embodiment, a liquid fire retardant composition composed of an aqueous solution of phosphoric acid ($H_3PO_4$), ammonium sulfate (($NH_4$)$_2SO_4$) and water, is applied to the cellulose fiber material to produce a fire retardant material composed of cellulosic fibers comprising the liquid fire-retardant composition absorbed to, adsorbed to, adhered to and/or dried thereon.

In exemplary embodiments, a low cost ammonium sulfate is the primary flame retardant. However, ammonium sulfate is prone to off-gassing ammonia, corroding steel and copper because of the devolving ammonia, will not prevent relight, and in some cases will not prevent smolder. The presence of boric acid can prevent smolder and relight but it is insufficiently soluble in water to reduce the pH of an ammonium sulfate solution and thus cannot stabilize the ammonium sulfate to prevent outgassing of ammonia. Consequently, devolution of ammonia with its odor and corrosion potential results. A strong acid (e.g., sulfuric acid) can lower the pH of an ammonium sulfate solution such that ammonia does not evolve, thus eliminating odor and corrosion threat. However, sulfuric acid and other similarly strong acids will themselves corrode metal materials while lending little to smolder prevention and nothing to relight issues.

It was surprisingly found that combining phosphoric acid with the ammonium sulfate component (in water), in an amount effective to lower the pH of the cellulose material to pH 5 to 6.5, which eliminated off-gassing of ammonia from the ammonium sulfate component, with the treated cellulose material passing the corrosion test set forth in ASTM-C-739, provided a strong smolder component, and was an affordable chemical component. In addition, in contrast to boric acid which functions as a biocide/herbicide, phosphoric acid is harmless to plants, which allows the by-product (dust component) of the present fire retardant-treated cellulose material to be converted to mulch. The addition of phosphoric acid thus eliminates the need for boric acid (for smolder).

In embodiments, the ammonium sulfate (($NH_4$)$_2SO_4$) and phosphoric acid ($H_3PO_4$) components are combined in amounts effective to maintain the resulting products at a pH of 5 to 6.5, which resolves the issues of off-gassing of ammonia and corrosion of metal substrates.

In an embodiment, an effective amount of phosphoric acid ($H_3PO_4$) is included in the composition to maintain the treated cellulose material at a pH of 5 to 6.5 to inhibit or prevent off-gassing of ammonia from the ammonium sulfate component. Being a weak acid, the phosphoric acid component can lower the pH of the cellulose material to 5 to 6.5 (e.g., 5 to 5.6) to eliminate off-gassing of ammonia from the ammonium sulfate (($NH_4$)$_2SO_4$) component without corroding metal substrates (e.g., Al, Cu and Fe) (as required by the corrosion test set forth in ASTM-C-739) by the application of the treated cellulose material, e.g., cellulose insulation). As a result, corrosion under insulation (CUI) of metal parts, structures and materials that underlie the insulative material caused by wetting of a fire retardant cellulose fiber material by water, for example, in the occurrence of a leak in the roof or other like event, is inhibited or prevented. In an embodiment, an effective amount of phosphoric acid is included to maintain the treated cellulose material at a pH of at least 5, or at least 5.2, or at least 5.3, or at least 5.4, or at least 5.5, up to 6.5, or up to 6.4, or up to 6.3, or up to 6.2, or up to 6.1, or up to 6.0, for example, a pH of 5 to 6.5, a pH of 5.2 to 6.5, a pH of 5.4 to 6.5, or a pH of 5.5 to 6.5 or a pH of 5.5 to 6.0.

In an embodiment, the liquid fire-retardant composition is an aqueous solution comprising phosphoric acid ($H_3PO_4$), ammonium sulfate (($NH_4$)$_2SO_4$) and water, and optional non-fire retardant additives. In an embodiment, the liquid fire-retardant composition is an aqueous solution consisting of phosphoric acid ($H_3PO_4$), ammonium sulfate (($NH_4$)$_2SO_4$) and water, and optional non-fire retardant additives. In an embodiment, the liquid fire-retardant composition is an aqueous solution consisting essentially of phosphoric acid ($H_3PO_4$), ammonium sulfate (($NH_4$)$_2SO_4$) and water, and optional non-fire retardant additives.

In an embodiment, the composition is a 10 to 35% aqueous solution comprising phosphoric acid ($H_3PO_4$) and ammonium sulfate (($NH_4$)$_2SO_4$). In an embodiment, the weight ratio of phosphoric acid ($H_3PO_4$) to ammonium sulfate (($NH_4$)$_2SO_4$) in the aqueous solution can vary from 1:19 to 5:15 (w/w), with the composition having a sum total concentration of phosphoric acid ($H_3PO_4$) and ammonium sulfate (($NH_4$)$_2SO_4$) of from 10 to 35 wt %. By way of example, the composition can be formulated as a 10% to 35% aqueous solution with the following amounts of the phosphoric acid ($H_3PO_4$), ammonium sulfate (($NH_4$)$_2SO_4$) and water components as shown in Table 1 below.

TABLE 1

|  | 10% solution | | 35% solution | |
| --- | --- | --- | --- | --- |
| $H_3PO_4$:($NH_4$)$_2SO_4$ ratio (w/w) | 1:19 | 5:15 | 1:19 | 5:15 |
| $H_3PO_4$ (wt %) | 0.5 | 2.5 | 1.75 | 8.75 |
| ($NH_4$)$_2SO_4$ (wt %) | 9.5 | 7.5 | 33.25 | 26.5 |
| Water (wt %) | 90.00 | 90.0 | 65.00 | 65.0 |

In an exemplary embodiment, the composition is a 10% aqueous solution comprising 0.5 to 2.5 wt % phosphoric acid ($H_3PO_4$), and 9.5 to 7.5 wt % ammonium sulfate (($NH_4$)$_2SO_4$), with the balance water, which, in an embodiment, has a pH of 1.75 to 2.6. In another exemplary embodiment, the composition is a 35% aqueous solution comprising 1.75 to 8.75 wt % phosphoric acid ($H_3PO_4$), and 33.25 to 26.25 wt % ammonium sulfate (($NH_4$)$_2SO_4$), with the balance water, which, in an embodiment, has a pH of 1.6 to 2.5.

In exemplary embodiments, the liquid fire retardant composition includes effective amounts of phosphoric acid ($H_3PO_4$) and ammonium sulfate (($NH_4$)$_2SO_4$) such that a treated cellulose material will have a Critical Radiant Flux (CRF) value of at least 0.12 watts/cm$^2$, which will pass testing requirements, for example, the requirements according to ASTM C-739 (Standard Specification for Cellulosic Fiber Loose-Fill Thermal Insulation). The CRF value indicates the minimum radiant energy (watts/cm$^2$) needed for a fire to sustain flame propagation. A "pass" is achieved if the cellulose material will not support surface flame while being subjected to radiation of 0.12 watts/cm$^2$ or less.

In an embodiment, the liquid fire-retardant composition can further include optional non-fire retardant additives. For example, in order to enhance the wetting or impregnation of the cellulosic fiber material by the liquid fire retardant composition, a conventional wetting agent or surfactant may be included in the composition, such as a polyoxyethylene alkyl phenol, e.g. TRITON X-100 (The Dow Chemical Company). In embodiments utilizing a wetting agent or surfactant, the liquid fire-retardant composition generally includes 0.02 to 0.2 wt % of one or more wetting agents or surfactants, more typically 0.04 to 0.1 wt %, and more typically 0.1 wt %, based on the total weight of the liquid fire retardant composition.

In an embodiment, the liquid fire-retardant composition is delivered in a spray booth using a spraying system that can include one or more spraying nozzles connected to a source of the liquid fire retardant composition, e.g., a tank. Spray booths are well known in the art. The liquid fire retardant composition can be delivered onto the cellulose material in a fine mist composed of a plurality of droplets (e.g., droplets 40 to 200 microns in diameter). Application of the liquid fire retardant composition produces a fire retardant shredded cellulose material that is moistened (wetted) with the liquid fire retardant composition.

For some applications, immersion of the reduced size cellulose material in the liquid fire retardant composition is preferred, for example, when manufacturing insulation blankets from fibers such as flax and jute for use in the automobile market. In such an application, the reduced size cellulose material can be immersed in a bath containing the liquid fire retardant composition, and then dried. Optionally, to remove excess liquid prior to drying, the cellulose material can be passed through a dewatering device such as a vacuum screening apparatus or rollers.

The amount of the liquid fire-retardant composition that is applied should be sufficient to provide a CRF value of at least 0.12 W/cm$^2$. In an embodiment, the liquid fire-retardant composition comprises a weight ratio of phosphoric acid ($H_3PO_4$) to ammonium sulfate (($NH_4$)$_2SO_4$) of 1:19 to 5:15 (w/w). In an embodiment, the application of the liquid fire-retardant composition preferably produces a wetted/moistened cellulose material that comprises 5 to 15 wt % of the sum weight of phosphoric acid ($H_3PO_4$) and ammonium sulfate (($NH_4$)$_2SO_4$), based on the total weight of the cellulose material.

Dwell Time

In embodiments, after the application of the liquid fire-retardant composition, a "dwell" time (delay period) is allowed to elapse in order to ensure diffusion of the liquid fire retardant composition into the cellulose fibers. For example, the wetted cellulose material can be held in a hopper or other containment vessel for a desirable time period, for example, up to 45 seconds to 120 seconds (up to 2 minutes) or longer, and in embodiments, from 2 to 15 minutes.

Drying

After the application of the liquid fire retardant composition, the wetted cellulose material is dried to remove the water from the applied composition. Removal of the water through drying reduces the amount of dust produced in subsequent processing through the hammermill and/or fiberizer. In embodiments, the wetted cellulose material is transferred by a stream of air (e.g., heated air) into a drying chamber such as a rotary drier and a tumble drier, among others. In preferred embodiments, the dried cellulose material is "air dried" (e.g., 90 to 95% dry) having a 5% to 10% moisture content.

Fiberizer/Hammer Mill

The dry, fire retardant-treated cellulose material can then be transferred, for example, by air flow, to a hammer mill, fiberizer or both, such as known and used in the art, to further reduce the size of the shredded material into smaller pieces, for example to an average length and width of 0.25 to 0.5 inches (0.6 to 1.25 cm). In embodiments, the cellulose material can be dried, for example, by applying heat to the wetted material prior to or during the transfer of the material.

Fiberizers and hammer mills are known and used in the art. The fiberizer, for example, is a mechanical device configured with rotating elements in close proximity to one or more sets of static or counter rotating elements such that when the cellulose material is conveyed through the device, a finely divided material is produced. Processing through the fiberizer reduces the size of the cellulose material to a desired, final reduced size, fluffy form. For a cellulose insulation product, it is preferred that the final product will have a settled bulk density of 1 to 2 lbs/ft$^3$ (e.g., 1.2 to 1.6 lbs/ft$^3$).

Dedusting

The size reduction processing in the fiberizer/hammer mill typically produces a substantial quantity of dust (i.e., material with very small particle size), which contains residues and chemicals that can be easily inhaled and pose significant problems such as lack of visibility and personal nuisance due to a high amount of air-borne dust particles, particularly when the material is pneumatically applied, for example, as an insulation.

In embodiments, the fire-retardant cellulose fiber material can be de-dusted to eliminate a major amount (i.e., at least 50% by volume or more) to substantially all (i.e., about 90-100% by volume) of the dust, and produce a low-dust fire-retardant cellulose fiber material that has functionally equivalent fire-retardant properties as the fire-retardant cellulose fiber material before de-dusting. The de-dusted product can be characterized by a substantial absence of detached fibrous residue which, if present, can increase its density.

In embodiments, because the fire retardant chemical is in liquid form only, it will be absorbed/adsorbed into the cellulose fiber and the interstices between the fiber mesh. Consequently, the treated cellulose material can undergo a rigorous dedusting procedure, with only a little loss of fire retardant efficiency. By comparison, although cellulose fiber treated with a powdered chemical can undergo dedusting, it would lose much of its fire retardant efficiency due to the removal of a high percentage of the powdered chemical and the cost of flame retarding by adding excess powdered chemical to compensate for the loss tends to be cost prohibitive.

Such a dust removal (de-dusting process is described in US 2010/0086780 (Shutt) (issued as U.S. Pat. No. 9,045,605) can be performed by any suitable process, for example, by screening, air classification, or other known separation techniques. Preferably, the de-dusting is performed by a screening technique or screening in combination with another separation technique.

In preferred embodiments, the screen has a mesh size that is suitable for effectively separating a desired amount of dust from the dried product. In embodiments, the screen has a mesh size to effectively separate a sufficient amount of dust from the dried product, preferably to produce a substantially dust-free material by removing at least about 50% by volume of the dust content of the dried product, more preferably at least about 70%, and more preferably at least 90%, up to 100%, by volume of the dust. The mesh of the screen can range from about 50 mesh to about 10 mesh, and is preferably about 40 mesh to about 14 mesh, more preferably about 30 mesh to about 20 mesh.

In embodiments, the dedusting procedure can result in a reduction in the level of flame-retardance of the treated cellulose material due to the removal of the dust component which includes an amount of the fire-retardant component.

The reduction in flame-retardance level resulting from a dedusting process can be rectified by applying an added or extra amount of the aqueous fire retardant composition to the cellulose material. In an embodiment, a composition comprising an additional 1 to 5, or 1 to 2 wt % of $H_3PO_4$ and $(NH_4)_2SO_4$ (sum total at a 1:19 to 5:15 w/w ratio) based on the total weight of the composition, can be applied to the cellulose fiber material if a dedusting process is to be followed.

In embodiments, the de-dusting removes about 15 to 30 wt %, or 15 to 25 wt % of the overall weight of the final product in the form of dust particles.

In embodiments, a reduced-size dry cellulose product that has been processed according to the invention using a liquid fire-retardant chemical, will typically contain about 15 to 25% by weight (wt %) dust, which is composed of about 87 to 92 wt % cellulose-based material (e.g., paper) with about 8 to 13 wt % of fire-retardant chemical adhered to the dust. De-dusting according to the invention can remove a substantial amount of dust (up to 100% of the dust) from the reduced-size dry product with substantially no loss of fire-retardant properties when an extra amount of the aqueous composition (e.g., an additional 1 to 5 wt %) is applied to the cellulose material prior to the de-dusting step.

In an embodiment, the dried, de-dusted fire-retarded cellulose fiber material (product) (e.g., insulation) has a pH of at least 5, or at least 5.2, or at least 5.3, or at least 5.4, or at least 5.5, up to 6.5 for example, a pH of 5 to 6.5, a pH of 5.4 to 6.5, or a pH of 5.5 to 6.5.

Mulch

In an embodiment, the dust generated from the de-dusting step can be processed into pellets for use as a mulch product, for example, to fertilize the soil, hydroseeding, and/or as a soil attenuation product, among other uses.

In an embodiment, the cellulose dust by-product derived from de-dusting a cellulose material treated according to the invention is eco-friendly and suitable for use as a mulch product (e.g., a fertilizer, seed carrier, etc.) and other agricultural purposes. In an embodiment, the dust component is composed of cellulose, phosphoric acid ($H_3PO_4$) and ammonium sulfate (($NH_4)_2SO_4$).

In an embodiment, the dust powder by-product resulting from the de-dusting step can be optionally mixed, for example, with a binder such as water, nutrients, seeds, dyes and/or other optional additives. The composition can be fed into a conventional pellet mill, pelletized (e.g., size ranging from granular to large pellets), and air-dried to a desired water content. The pelletized material can then be deposited into a holding bin or conveyed to a bagging apparatus, as known and used in the art, and packaged for transport and future use.

Final Product/Packaging

In an embodiment, the final fire-retarded cellulose product, e.g., insulation, based on the total weight of the product, comprises:
a) 85 to 94 wt % cellulose fibers;
b) 5.5 to 14.5 wt % phosphoric acid ($H_3PO_4$) and ammonium sulfate (($NH_4)_2SO_4$); and
c) 0 to 0.5 wt % surfactant.

In an embodiment, a cellulose product (e.g., cellulose insulation) produced by applying the liquid fire retardant composition to a cellulose material, has a pH of at least 5, or at least 5.2, or at least 5.3, or at least 5.4, or at least 5.5, up to 6.5, for example, a pH of 5 to 6.5, a pH of 5.2 to 6.5, a pH of 5.4 to 6.5, or a pH of 5.5 to 6.5.

The foregoing fire-retarded cellulose product meets government regulations governing fire and flame retardance, smolder, smell, mold and corrosion for insulation products. Importantly and surprisingly, with the foregoing fire-retarded cellulose product, outgassing of ammonia is eliminated under all but extreme conditions.

In an embodiment, the fire retardant cellulose fiber material is without the presence of ammonia.

In an embodiment, the fire retardant cellulose fiber material is without the presence of boric acid or borate salt.

In an embodiment, the final cellulose product includes an amount of phosphoric acid ($H_3PO_4$) and ammonium sulfate (($NH_4)_2SO_4$), which is sufficient and effective to provide a level of fire retardance to meet government standards for both the smoldering combustion test and the flame spread burn test, which for insulation is outlined, for example, in ASTM C-739 (Standard Specification for Cellulosic Fiber Loose-Fill Thermal Insulation).

In embodiments, the treated cellulose fiber material has a CRF value of 0.12 watts/cm$^2$ or greater, as measured according to ASTM C-739. In embodiments, the final cellulose product is treated with an amount of the liquid fire retardant composition sufficient and effective to provide a level of fire retardance sufficient to attain a Category B listing in Europe.

The dried cellulose product can be deposited into a holding bin or conveyed to a bale press or baler or to a bagging apparatus, as known and used in the art, and packaged for transport and future use. In an installation process for insulation, the fire retarded cellulose insulation product can be placed into a hopper and mechanically fluffed-up, and then "blown" directly into an attic or stud spaces in an existing wall, among other applications.

The fire-retarded cellulose product of the invention can be used for producing fire-retarded products including building materials such as but not limited to cellulose insulation, fire doors and cellulose-based board materials (e.g., panels), as well as automotive fabrics, among other articles.

In an embodiment of the present invention, fire resistance of the cellulose product is imparted solely by the presence of phosphoric acid ($H_3PO_4$) and ammonium sulfate (($NH_4)_2SO_4$) as the fire retardant chemical, which is derived exclusively from the applied liquid fire retardant composition, without the application of a fire retardant chemical in powder form.

The present cellulose insulation and other products and materials possess the required level of fire retardance to meet government standards for both the smoldering combustion test and the flame spread burn test, and further meets government regulations for corrosion, smell, and mold. The elimination of powdered fire retardant chemicals such as hydrated borax, aluminum trihydrate (ATH), etc., significantly lowers manufacturing costs and eliminates potential health issues associated with the use of boric acid/borates.

In embodiments of the present invention, the only chemicals used for imparting fire and smolder resistance are phosphoric acid and ammonium sulfate, which are applied to the cellulose material exclusively as an aqueous solution, without the application of fire retardant chemicals in powdered form. Surprisingly, the applied liquid fire retardant composition provides a cellulose insulation and other products having the required level of fire retardance to meet federal standards for both the smoldering combustion test and the flame spread burn test, while eliminating the outgassing of ammonia, compared to other cellulose material produced using ammonium sulfate as a fire retardant chemical. The present compositions also significantly reduce the cost of manufacture of the fire-retarded cellulose insulation compared to insulation produced by the application of a powdered chemical. The use of the present compositions significantly lowers manufacturing costs, avoids outgassing of ammonia, and eliminates potential health issues associated with the use of boric acid/borates.

Hybrid System

Not only is the application of the liquid fire-retardant composition more efficient in achieving a fire-retarded cellulose material than the sole application of typical powdered fire-retardant chemicals, its application is less dangerous in terms of sterility and ammonia off-gassing. However, application of the liquid fire-retardant composition as the sole fire-retardant component generally imposes the need for added capital investment, processing costs and operating space (sq. ft.) associated, for example, with driers and other required processing equipment. The sole use of a liquid solution to fabricate a fire-retardant cellulose material requires a drying step and associated processing equipment, which adds to production and maintenance costs. Under some conditions, drying requirements can be extensive.

Thus, in some applications, it is desirable to utilize a hybrid system according to the invention, for example, to reduce and/or eliminate equipment and processing costs required for drying the material. Existing cellulose processing plants typically may not have such space available for running a process that solely utilizes a liquid fire-retardant composition to fabricate fire-retarded cellulose insulation or other materials. However, in these same plants, a hybrid system according to the invention could be installed that would increase profit by reducing chemical costs and, at the same time, eliminate the use of borates.

In embodiments, a "hybrid" fire-retardant cellulose material can be produced by the application of the liquid fire-retardant composition as the major fire-retardant chemical component in combination with a powdered fire-retardant chemical component. By utilizing a "hybrid" system of applying the fire-retardant chemicals as a combination of both the liquid fire-retardant composition and a powdered fire-retardant component to produce a hybrid fire-retardant cellulose material, difficulties of solely applying either a liquid formulation or powdered chemicals as the fire-retardant component can be reduced or eliminated.

Thus, in embodiments of a hybrid system, the liquid fire-retardant composition is formulated to prevent ammonia off-gassing and, in combination with a powdered chemical component, to assist in meeting ASTM C-739 requirements for cellulosic insulation The powdered fire-retardant component is preferably an acidic to neutral compound (e.g., magnesium sulfate, $MgSO_4$, or an insoluble compound (e.g., aluminum trihydrate). The powdered fire-retardant chemical component that is applied should have a pH of 7.0 or less. In an embodiment, the powdered fire-retardant chemical component that is applied also has a large endothermic reaction to dehydration caused by the heat of combustion of cellulose. It is also preferred that the powdered fire-retardant chemical is inexpensive in order to reduce costs of production of the fire-retardant cellulose material (e.g., cellulose insulation).

In an embodiment, the liquid fire-retardant composition is formulated as a highly concentrated solution, e.g., a 30% to 40% solution, of the phosphoric acid and ammonium sulfate components. In embodiments, with the application of a higher concentrated composition, to the cellulose fiber material, a drying step to remove the water component can be optional due, for example, to the drying effect of heat generated from the processing equipment.

The powdered fire-retardant chemical component that is applied should have a pH of 7.0 or less. In an embodiment, the powdered fire-retardant chemical component that is applied has a high endothermic reaction to heat.

In embodiments, nonlimiting examples of powdered fire retardant chemicals that can be applied include calcium sulfate dihydrate ($CaSO_4.2H_2O$ (gypsum)), native gypsum, magnesium sulfate heptahydrate ($MgSO_4$ (Epsom salt)), aluminum trihydrate (ATH), and combinations thereof. These chemicals present no danger of corrosion.

In embodiments, the liquid fire-retardant composition utilized to produce a hybrid fire-retarded cellulose material comprises, or consists of, or consists essentially of, phosphoric acid ($H_3PO_4$), ammonium sulfate ($(NH_4)_2SO_4$, and water, and optional non-fire retardant additives. In an embodiment, the liquid fire retardant composition comprises an amount of the phosphoric acid, ammonium sulfate and water components such that ammonia does not off-gas from the treated cellulose material (e.g., cellulose insulation) under extreme use conditions such as exposure to water and/or to heat up to 400° F., for example. In an embodiment, the liquid fire retardant composition has a pH of 1.75 to 2.6. In an embodiment, the powdered fire-retardant chemical component comprises, or consists of, or consists essentially of, magnesium sulfate hydrate, calcium sulfate hydrate, native gypsum, aluminum hydrate, or a combination thereof.

In embodiments, the liquid fire-retardant composition is applied to the cellulose material to produce a partially fire-retarded cellulose material. By "partially fire-retarded," it is meant that the cellulose material does not yet meet approved government requirements. Consequently, in embodiments, a powdered fire retardant chemical is added to the cellulose fiber material in a sufficient quantity to bring the cellulose insulation into compliance with government requirements for insulation. In embodiments, a dedusting step can be eliminated and the powdered chemical flame retardant added at the final grinding stage to bring the cellulose insulation into compliance with government requirements for insulation.

The amount of the powdered fire retardant chemical added to the cellulose material is associated with the effectiveness of the powdered chemical and the level of fire retardancy needed to meet government standards for insulation. In an embodiment, an amount of powdered chemical is added to the cellulose material to achieve a total loading of fire retardant chemical, in combination with fire retardant chemical (phosphoric acid and ammonium sulfate) from application of the liquid fire-retardant composition, to meet ASTM C-739 standards. In an embodiment, an amount of powdered chemical is applied to provide a total loading of 11 to 19 wt % of fire retardant chemical based on the weight of the cellulose material. In an embodiment, from 5, or 8, or 10, up to 16, parts of powdered fire retardant is added per 100 parts of the dried cellulose material.

The combined amounts of the liquid fire retardant composition and the powdered fire retardant component are effective to provide a sufficient level of fire retardance to the cellulose material to meet government standards for both the smoldering combustion test and the flame spread burn test, as outlined in ASTM C-739 (Standard Specification for Cellulosic Fiber Loose-Fill Thermal Insulation), and/or European standards Category B and/or Category C.

In an embodiment, a hybrid fire-retarded cellulose fiber material is produced by applying a liquid fire retardant composition comprising an aqueous solution of phosphoric acid and ammonium sulfate to a cellulose material, which are absorbed, adsorbed and/or adhered to the cellulose material (e.g., fibers), such that the cellulose material has a pH of about pH 5 to 6.5. The treated material can then be transferred to a hammer mill, fiberizer or both, and a powdered fire-retardant chemical component is added to the cellulose material during the final grinding stage such that the powdered chemical is "beaten" into the fibrous structure of the cellulose. In an embodiment, as the dried cellulose material is metered into the fiberizer/hammer mill (e.g., using a metered delivery system such as an auger), a powdered fire retardant chemical (or chemical composition) can be metered into the apparatus (e.g., using a device such as an auger). Optionally, the treated hybrid fire-retarded cellulose material can undergo a de-dusting step to remove and eliminate an amount of dust from the material. A hybrid fire-retarded cellulose product (e.g., cellulose insulation) produced by applying the liquid fire retardant composition to a cellulose-based material and then adding the powdered fire-retardant chemical component, will not support fungus and will pass the requirements of ASTM C-739.

In an embodiment, the method of producing a fire-retarded cellulose fiber material according to the invention comprises the steps of:

applying a solution of a liquid fire-retardant composition to a cellulose material to produce a wetted, fire retardant-treated cellulose material, wherein the liquid fire-retardant composition comprises an aqueous solution of phosphoric acid ($H_3PO_4$), ammonium sulfate (($NH_4$)$_2SO_4$) and water, and optionally, one or more additives;

drying the wetted, fire retardant-treated cellulose material to produce a dried cellulose material having the liquid fire-retardant composition absorbed therein and/or dried thereon;

reducing the dried cellulose material in size while adding a powdered fire retardant chemical component to produce a reduced size, fire retarded cellulose fiber material; and optionally, removing an amount of dust material from the reduced size, fire-retardant cellulose fiber material to produce a reduced-dust, fire-retardant cellulose fiber material.

In an embodiment, the invention is a fire-retarded cellulose fiber material (e.g., cellulose insulation) comprising cellulosic fibers and phosphoric acid ($H_3PO_4$) and ammonium sulfate (($NH_4$)$_2SO_4$) absorbed, adsorbed and/or adhered to the cellulose fibers, and one or more powdered fire-retardant chemicals within the cellulose fibrous structure.

In an embodiment, the dried fire-retarded cellulose fiber material (product) (e.g., insulation) has a pH of 5 to 6.5.

In an embodiment, the dried "hybrid" fire-retarded cellulose fiber material (product) (e.g., insulation) comprises, based on the total weight of the cellulose fiber material:

a) 82 to 90 wt % cellulosic fiber;
b) 2 to 5 wt % phosphoric acid ($H_3PO_4$) and ammonium sulfate (($NH_4$)$_2SO_4$) in a ratio of 1:19 to 5:15 (w/w); and
c) 5 to 16 wt % of one or more powdered chemicals.

In an example embodiment, the "hybrid" fire retardant cellulose fiber material comprises, based on the total weight of the cellulose fiber material, 81 to 89 wt % of cellulose fiber, and 11 to 19 wt % of fire-retardant chemical which includes phosphoric acid ($H_3PO_4$), ammonium sulfate (($NH_4$)$_2SO_4$) and one or more powdered chemicals.

In an embodiment, the final cellulose product includes an amount of phosphoric acid ($H_3PO_4$) and ammonium sulfate (($NH_4$)$_2SO_4$) from the liquid fire-retardant composition, and an additional amount of a powdered chemical component, which is sufficient and effective to provide a level of fire retardance to meet government standards for both the smoldering combustion test and the flame spread burn test, which for insulation is outlined, for example, in ASTM C-739 (Standard Specification for Cellulosic Fiber Loose-Fill Thermal Insulation).

Unless otherwise indicated, all numbers expressing quantities of ingredients, properties such as reaction conditions, and so forth as used in the specification and claims are to be understood as being modified in all instances by the term "about."

DEFINITIONS

The term "liquid fire retardant composition" and like terms, as used herein, means an aqueous solution composed solely of phosphoric acid and ammonium sulfate as the fire-retardant chemical component. A liquid fire retardant chemical composition can optionally include one or more non-fire retardant additives (e.g., surfactants).

The term "composition" and like terms, as used herein, mean a mixture or blend of two or more components.

The term "fire", as used herein, refers to the process of burning of cellulose by flame or smolder. The terms "flame" and "flammable", as used herein, refer to the burning of gases resulting from pyrolysis due to heat. The term "smolder" or smoldering combustion, as used herein, refers to the burning of a carbon-rich material remaining after gases have devolved (e.g., as with charcoal in a barbeque). Both burning processes can be tested by the methods, for example, as outlined in ASTM C-739 (Standard Specification for Cellulosic Fiber Loose-Fill Thermal Insulation) and as mandated by law.

The term "fire-retardant chemical", as used herein, refers to a chemical substance or mixture (other than water) that reduces flammability or smolder of a cellulose material. The term "fire retarded composition" or "fire retardant" cellulose material, and like terms, as used herein, refers to a composition or material having reduced flammability or smolder.

The term "powder fire retardant chemical component" and like terms, means a dry (non-aqueous) composition of one or more powder fire retardant chemicals.

The term, "hybrid system" and like terms, means the application of both a liquid fire retardant composition and a powder fire retardant component to a cellulose-based material. In embodiments, the liquid fire retardant composition and the powder fire retardant component are added separately to the cellulose material.

The term "bulk density" as used herein is defined to encompass the weight (traditionally in lbs·ft$^3$) of the final settled insulation product. A final product with a low bulk density is desirable because it imparts less weight to the building structure in which it is used. In addition, since cellulose insulation is typically sold by coverage (i.e., volume), an insulation material with a lower bulk density enables a manufacturer to sell less weight without diminishing performance.

Unless stated to the contrary, implicit from the context, or customary in the art, all parts and percentages are based on weight.

EXPERIMENTAL

Example 1

To prepare the aqueous fire-retardant composition, granular ammonium sulfate was added to water (15° C.) in a 200 gallon stainless steel tank with an attached stirrer, and stirred vigorously for 30 minutes. Phosphoric acid was then added and the mixture stirred 5 minutes. The concentration of the fire-retardant solution was 15%. The ratios of phosphoric acid to ammonium sulfate of the 15% aqueous solutions are shown in Table 2 below. The aqueous fire-retardant chemical composition was sprayed onto the cellulose fiber material.

Chemical load (%) from the aqueous fire-retardant composition is determined by calculating the difference in the weight of the tank containing the aqueous fire-retardant composition before and after application of the composition (by spraying) onto the cellulose material. For example, the application of 5.5 gallons/minute of a 20% concentration provided a 10% load of chemical on the cellulose fiber material at 3.5 bags per minute of 28 lbs. each, and the application of 7.3 gallons/minute of a 15% concentration provided a 10% load of chemical on the cellulose fiber material at 3.5 bags per minute of 28 lbs. each.

Tests were run at different ratios of $H_3PO_4/(NH_4)_2SO_4$ to determine how much phosphoric acid was needed to adjust the pH of the solution-treated, dedusted cellulose materials to eliminate off-gassing of ammonia. Table 2 shows the pH of the 15% solutions and the solution-treated, dedusted cellulose materials. At a pH of 5.0 to 6.5, the solution-treated cellulose will not corrode and ammonia is inhibited from off-gassing from the material.

TABLE 2

Effect of acid/sulfate ratio on pH at 15% solution concentration

| | | pH | |
|---|---|---|---|
| Example | $H_3PO_4/(NH_4)_2SO_4$ ratio (w/w) | 15% solution | Solution-treated Cellulose (~10% load) |
| 1 | 0.75:19 | 2.48 | 6.8 |
| 2 | 1:19 | 2.45 | 6.8 |
| 3 | 1.5:18.5 | 2.17 | 6.5 |
| 4 | 2:18 | 2.14 | 6.4 |
| 5 | 2.5:17.5 | 2.08 | 6.2 |
| 6 | 4:16 | 1.79 | 5.9 |
| 7 | 5:15 | 1.72 | 5.4 |

The results in Table 2 (above) show that Examples 3 through 7 utilizing a 15% solution comprising a ratio of $H_3PO_4/(NH_4)_2SO_4$ ranging from 1.5:18.5 to 5:15 (w/w) resulted in a fire retardant cellulose material having a pH 5.4 to 6.5, which was within the desired pH range to inhibit off-gassing of ammonia from the material.

Table 3 (below) shows the effect of the $H_3PO_4/(NH_4)_2SO_4$ ratio on CRF value of the solution-treated, dedusted cellulose material at an about 10% loading at an acid/sulfate ratio ranging from 1:19 to 2.5:17.5 (w/w).

TABLE 3

Effect of acid/sulfate ratio on CRF value of solution-treated, dedusted cellulose

| Example | $H_3PO_4/(NH_4)_2SO_4$ ratio (w/w) | Load (%) | pH of Solution-treated Cellulose | CRF* (watts/cm²) |
|---|---|---|---|---|
| 2 | 1:19 | 10.4 | 6.8 | 0.180 |
| 3 | 1.5:18.5 | 10.3 | 6.5 | 0.175 |
| 4 | 2:18 | 10.1 | 6.4 | 0.185 |
| 5 | 2.5:17.5 | 10.2 | 6.3 | 0.185 |
| Average | | 10.3 | — | 0.18 |

*CRF value, as measured according to ASTM C-739. A CRF value of 0.12 watts/cm² or greater is required for a "pass."

The results in Table 3 show that an increasing amount of phosphoric acid lowers the pH of the solution-treated, dedusted cellulose to a desired range (pH 6.3 to 6.5) with little or no effect on the CRF value.

Example 2

In the following example, an aqueous solution composed of a 15% concentration of flame retardant ($H_3PO_4$ and $(NH_4)_2SO_4$) was sprayed onto shredded recycled newsprint, which was then dried, fiberized and dedusted.

Table 4 shows the effect of a 7.5 to 9.0% chemical loading using a 15% solution of flame retardant at a ratio of 4:16 (w/w) $H_3PO_4:(NH_4)_2SO_4$ on the CRF value of solution-treated cellulose that underwent a dedusting process.

TABLE 4

Effect of Chemical Load on CRF value of Dedusted Cellulose

| Example | Load (%) | CRF* |
|---|---|---|
| 8 | 7.5 | 0.065 |
| 9 | 8.3 | 0.090 |
| 10 | 9.0 | 0.100 |

*CRF value, as measured according to ASTM C-739. A CRF value of 0.12 watts/cm² or greater is required for a "pass."

The results show that at a 7.5 to 9.0% loading, none of the dedusted samples had a CRF≥0.12 watts/cm². Consequently, a higher loading of a 15% solution is required to achieve a CRF value that is equal to or greater than 0.12 watts/cm².

Example 3

In the following example, an aqueous solution composed of a 15% concentration of flame retardant ($H_3PO_4$ and $(NH_4)_2SO_4$) was sprayed onto shredded recycled newsprint, which was then dried and fiberized, but not subsequently screened to remove dust.

Table 5 shows the effect of a 7.4 to 7.8% chemical loading using a 15% solution of flame retardant at a ratio of 4:16 (w/w) $H_3PO_4:(NH_4)_2SO_4$ on the CRF value of solution-treated cellulose that did not undergo a subsequent dedusting process.

TABLE 5

Effect of Chemical Load on CRF value of Non-Dedusted Cellulose

| Example | Load (%) | CRF* |
|---|---|---|
| 11 | 7.6 | 0.145 |
| 12 | 7.4 | 0.125 |
| 13 | 7.8 | 0.125 |
| 14 | 7.6 | 0.13 |

*CRF value, as measured according to ASTM C-739. A CRF value of 0.12 watts/cm² or greater is required for a "pass."

The results show that if the cellulose material is not dedusted, the chemical requirement for achieving a CRF value of 0.12 watts/cm² or greater, is less than that required for a fire-retardant treated cellulose material that undergoes a dedusting process.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations that operate according to the principles of the invention as described. Therefore, it is intended that this invention be limited only by the claims and the equivalents thereof. For purposes of United States patent practice, the contents of any referenced patent, patent application or publication are incorporated by reference in their entirety.

Example 4: Hybrid System

During the process of grinding and conveying the cellulose material that has been treated with the liquid fire-retardant composition, heat is generated which evaporates a portion of the absorbed water from the cellulose material. In a typical manufacturing plant that produces, for example, 4 bags per minute (BPM) through three grinding states, and under ambient conditions, between 4 pounds (lbs.) to 8 pounds of water, for example, can evaporate from the wetted cellulose material each minute due to the available heat such as that generated by friction within the grinding equipment. Thus, given that 4 to 8 lbs. of solvent (water) is evaporated, Table 6 below shows the amount of fire-retardant chemical (i.e., phosphoric acid and ammonium sulfate) incorporated into a 30-lb. bag of cellulose material from the application of the liquid fire-retardant composition (at the same spray rate) depending on bag production rate (i.e., 2, 3, and 4 bags per minute, BPM) and chemical concentration of the liquid, fire-retardant composition (ranging from 10 to 40%).

TABLE 6

Chemical Load (%) at 10 to 40% Concentration, 2 to 4 BPM production rate, and 4 to 8 lbs solute evaporation

| Chemical Concentration (%) | Production rate (BPM) | | |
|---|---|---|---|
| | 2 | 3 | 4 |
| 10 | 0.7-1.5% | 0.5-1.0% | 0.4-0.7% |
| 20 | 1.7-3.4% | 1.1-2.2% | 0.8-1.7% |
| 30 | 2.8-5.7% | 1.9-3.8% | 1.4-2.8% |
| 40 | 4.5-9.0% | 3.0-6.0% | 2.3-4.5% |

As shown in Table 5 above, applying a 15% concentration of the liquid fire-retardant will provide a 7.5% loading of fire-retardant chemical (i.e., phosphoric acid and ammonium sulfate), which will exceed the CRF requirement of 0.12 W/cm².

However, applying a 15% concentration of the liquid fire-retardant composition to provide a 7.5% loading of chemical would require drying equipment to drive off the water component. By increasing the concentration of the liquid fire-retardant composition, the viscosity is increased resulting in less penetration of the liquid component into the cellulose material, requiring the chemical loading to be increased to achieve the same CRF value. By example, if the concentration of the liquid fire-retardant composition is 25%, an about 8% loading is required, and at a 30% concentration of the liquid fire-retardant composition, a 10% loading is required. In both examples, a drying step would be required to evaporate the water component from the treated cellulose material.

Thus, in some embodiments, it is desirable to utilize a hybrid system according to the invention, to eliminate equipment and processing costs required for drying the material, and, in some embodiments, lower the cost of the fire-retardant chemicals that are utilized. By example, utilizing a 15% liquid fire-retardant composition under a production rate of 4 BPM, the amount of fire-retardant chemical that is contributed from the liquid composition can vary from 0.8% to 1.7% loading. With increased concentration, a higher amount of chemical can be used but with decreasing efficiency in loading. By example, increasing the chemical concentration of the liquid fire-retardant composition increases the amount of chemical required to achieve the same CRF result as a lower concentrated composition due to a higher viscosity and surface tension and the lower ability of the more highly concentrated liquid to spread over the surface of cellulose material. However, the same increase in concentration will increase the amount of the available chemical at a greater rate, as shown in Table 7 below. Consequently, the higher the concentration of the liquid fire-retardant composition, the greater the chemical loading that can be applied onto the cellulose material, resulting in a greater level of fire-resistance.

TABLE 7

Increased Concentration Effect of Liquid Fire-Retardant Composition

| | Ex. A | Ex. B | Ex. C |
|---|---|---|---|
| Concentration of liquid F.R. composition | 15% | 25% | 30% |
| Load needed to meet CFR value of 0.12 W/cc | 7.6 | 8.2 | 10.0 |
| % Increase over preceding example | — | 8% | 21% |
| Available chemical (at 4 BPM) | 1.2% | 2.1% | 3.5% |
| % Increase over preceding example | — | 75% | 67% |

Thus, in the use of a hybrid system according to the invention, in embodiments, a higher concentration liquid fire-retardant composition (e.g., 30% solution) requires less powdered fire-retardant chemical to improve fire resistance and meet ASTM C-739 standards, while a lower concentration (e.g., 15% solution) requires comparatively more of the powdered chemical component. The amount of powdered fire-retardant chemical that is required can vary according to the powdered chemical that is used. The Examples in Table 8 below illustrate two concentrations (20% and 30%) of the liquid fire-retardant composition and required loadings of two powdered fire-retardant chemicals. The powdered flame retardant is delivered, from an "Accutron Feeder", to the fiberizer simultaneously with the cellulose. The variable rpm of the auger within the Accutron is first calibrated, in pounds, with the powder prior to production so that the time of the run multiplied by the delivery rate allows determination of load.

TABLE 8

Powdered Chemical Loadings (%) to meet CRF value of 0.12 W/cc

| | Ex. D | Ex. E |
|---|---|---|
| Concentration of liquid F.R. composition | 20% | 30% |
| Loading (%) from liquid F.R. composition | 1.2 | 3.5 |
| Loading (%) of Magnesium Sulfate Hydrate | 0 | 6-8 |
| Loading (%) of Calcium Sulfate Hydrate | 14-18 | 0 |
| Bulk Density (pounds per cubic foot (PCF)) | 1.5-1.7 | 1.3-1.5 |

The foregoing detailed description is merely illustrative in nature and is not intended to limit the embodiments of the subject matter or the application and uses of such embodiments. Any implementation described herein as exemplary is not necessarily to be construed as preferred or advantageous over other implementations. Additionally, there is no intention to be bound by any expressed or implied theory presented in the preceding technical field, background or the detailed description. While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiments

What is claimed is:

1. A method of producing a fire-retarded cellulose fiber material, comprising:
   providing an aqueous fire-retardant composition comprising phosphoric acid, ammonium sulfate and water, and optionally, one or more non-fire retardant additives, the aqueous fire-retardant composition having a pH of 1.75 to 2.6, and the phosphoric acid and the ammonium sulfate having a weight ratio of 1:19 to 5:15;
   applying the aqueous fire-retardant composition to a cellulose material to produce a wetted, fire retardant-treated cellulose material comprising from 5 wt % to 15 wt % of a sum weight of the phosphoric acid and the ammonium sulfate, based on a total weight of the wetted, fire retardant-treated cellulose material;
   drying the wetted, fire retardant-treated cellulose material to produce a dried, fire retardant-treated cellulose material comprising phosphoric acid and ammonium sulfate absorbed, adsorbed and/or adhered to the cellulose material;
   processing the dried, fire retardant-treated cellulose material in size to produce a reduced size, fiberized, fire-retarded cellulose fiber material; and
   removing dust material from the reduced size, fiberized, fire-retarded cellulose material to remove from 15 wt % to 30 wt % of an overall weight of the reduced size, fiberized, fire-retarded cellulose material in the form of dust particles.

2. The method of claim 1, wherein the wetted, fire retardant-treated cellulose fiber material has a pH of 5 to 6.5.

3. The method of claim 1, wherein the fire-retardant component is the sole fire-retardant chemical component of the reduced size, fiberized, fire-retarded cellulose fiber material.

4. The method of claim 1, further comprising, adding a powdered fire retardant chemical component to the dried, fire retardant-treated cellulose material during the processing step to produce the reduced size, fiberized, fire-retarded cellulose fiber material.

5. The method of claim 4, wherein the powdered fire-retardant chemical component is selected from the group consisting of calcium sulfate dihydrate, native gypsum, magnesium sulfate heptahydrate, aluminum trihydrate (ATH), and combinations thereof.

6. The method of claim 1, wherein the reduced size, fiberized, fire-retarded cellulose fiber material is without the presence of a borate.

7. The method of claim 1, wherein the aqueous fire-retardant composition is a 5 to 35% aqueous solution comprising phosphoric acid ($H_3PO_4$) and ammonium sulfate (($NH_4$)$_2SO_4$).

8. The method of claim 1, wherein the aqueous fire-retardant composition consists essentially of phosphoric acid, ammonium sulfate and water, and optionally, one or more non-fire retardant additives.

9. The method of claim 1, wherein the aqueous fire-retardant composition consists of phosphoric acid, ammonium sulfate and water, and optionally, one or more non-fire retardant additives.

10. The method of claim 1, wherein the reduced size, fiberized, fire-retarded cellulose fiber material comprises:
    a) 85 to 94 wt % cellulose fibers;
    b) 5.5 to 14.5 wt % phosphoric acid ($H_3PO_4$) and ammonium sulfate (($NH_4$)$_2SO_4$); and
    c) 0 to 0.5 wt % surfactant;
    wherein the wt % is based on the total weight of the reduced size, fiberized, fire-retarded cellulose fiber material.

11. The method of claim 1, wherein the reduced size, fiberized, fire-retarded cellulose fiber material has a CRF value of 0.12 watts/cm$^2$ or greater, as measured according to ASTM C-739, and meets government standards for fire retardance levels.

12. The method of claim 1, wherein an amount of the liquid fire-retardant composition is applied to the cellulose material to meet at least one of ASTM C-739, European Category B and European Category C.

13. The method of claim 11, wherein 50 to 99% of the dust material is removed.

14. The method of claim 1, further comprising, processing the removed dust material to produce a mulch product.

* * * * *